United States Patent [19]
Yoda et al.

[11] Patent Number: 4,713,278
[45] Date of Patent: Dec. 15, 1987

[54] MAGNETIC RECORDING MEDIUM

[75] Inventors: Kuniichi Yoda; Eiji Kitaura; Tsutomu Tsunoda, all of Saku; Yoshio Kawakami, Nagano, all of Japan

[73] Assignee: TDK Corporation, Tokyo, Japan

[21] Appl. No.: 904,123

[22] Filed: Sep. 4, 1986

[30] Foreign Application Priority Data

Sep. 9, 1985 [JP] Japan ............................. 60-197802

[51] Int. Cl.⁴ ................................................ G11B 5/70
[52] U.S. Cl. .................................. 428/141; 428/694; 428/900
[58] Field of Search ................... 428/694, 900, 141; 427/128

[56] References Cited

U.S. PATENT DOCUMENTS

| | | | |
|---|---|---|---|
| 4,439,486 | 3/1984 | Yamada et al. | 428/694 |
| 4,532,178 | 7/1985 | Matsumoto | 428/900 |
| 4,562,117 | 12/1985 | Kikukawa et al. | 428/694 |
| 4,592,942 | 6/1986 | Nishimatsu et al. | 428/694 |

Primary Examiner—Paul J. Thibodeau
Attorney, Agent, or Firm—Seidel, Gonda, Goldhammer & Abbott

[57] ABSTRACT

A magnetic recording medium comprises a light-shielding base in the form of a tape or sheet, and a magnetic layer composed of a magnetic powder of Co-coated $\gamma$-Fe$_2$O$_3$ dispersed in a resin binder and applied to the base. The powder has a specific surface area as determined by the BET adsorption method of at least 35 m$^2$/g. The light-shielding base portion contiguous to the magnetic layer is a transparent plastic film and the lower base portion is light-shielding. The light-shielding base has a light transmittance of 30% or below. The surface roughness of the base is, in terms of the centerline average surface roughness, 0.012 $\mu$m or below.

4 Claims, 5 Drawing Figures

MAGNETIC RECORDING MEDIUM

BACKGROUND OF THE INVENTION

This invention relates to a magnetic recording medium of the type consisting of a base in the form of a tape or sheet coated with a magnetic layer made of a magnetic powder dispersed in a binder. More particularly, the invention concerns a magnetic recording medium of the type defined above which excels in electromagnetic properties and is suitable for use with an automatic magnetic tape stopping system.

Compact household video tape recorders, or home video units, using the ½-in.-wide magnetic recording medium (magnetic tape) have rapidly spread in recent years. The recording medium to be used comprises a nonmagnetic base in the form of a tape or sheet and a magnetic layer made of a magnetic powder dispersed in a resin binder and formed thereon. The magnetic recording-reproducing units, intended primarily for use at home, are designed and built to be simple to operate.

For an example, the home video unit is equipped with means of automatically stopping the magnetic tape when the tape end has been reached during the run, such as for recording, playback, fast forward, or fast rewind motion. The principle of the mechanism is as follows. The magnetic tape is provided with short lengths of transparent leader tape spliced to the both ends. The video unit is equipped with means to direct a beam of light to the running magnetic tape during the operation and detect the light transmitted through the leader tape portion as an indication of the arrival of the starting or finishing tape end. Upon detection of the transmitted light the system brings the magnetic tape to a stop. The means for transmitted light detection would in some cases respond to light from sources other than the video unit. To avoid this, the detector is designed to remain inoperative when the quantity of light transmitted through the tape is less than a certain reference level. In this country the reference level, or light transmittance of the magnetic tape body, should be 0.1% or below as measured in conformity with the procedure of Japanese Industrial Standards C-6280.

For more accurate operation of the automatic stopping system based on the above principle, it is essential that the magnetic tape body be sufficiently light-shielding. Apparently, the end may be achieved, for example, by (1) making the magnetic layer thick enough to keep light from traveling through the magnetic tape body, (2) allowing the magnetic layer to contain a large proportion of a light-shielding substance so that, even if the layer itself is thin, light transmission through the magnetic tape body can be prevented, or (3) employing a magnetic powder which transmits little light. Of these methods, (1), or the adoption of a thicker magnetic layer, has a drawback of an increased loss of recording efficiency due to the influence of an antimagnetic field. Also, the magnetic tape for the home video unit that must be compact in construction cannot have a greater thickness (than the usual level of about 15 to 20 $\mu$m). If the magnetic layer is to be thicker, the base film that supports the layer will have to be thinner accordingly. This will result in a sacrifice of the strength of the magnetic tape and frequent break or deformation of the tape.

The next method (2) possibly involves the inclusion of a large proportion of carbon powder or the like into the magnetic layer. In order to prevent the light transmission, the layer must contain at least about 10% by weight of carbon powder or the like on the basis of the weight of $\gamma$-$Fe_2O_3$ or other magnetic powder. Magnetic tape with such a large carbon powder content presents a problem of very poor electromagnetic properties.

The last resort (3) is the replacement of $\gamma$-$Fe_2O_3$ by a less light-transmissive substance, perhaps $Fe_3O_4$. However, the latter is undesirable as a magnetic powder for magnetic recording medium because of its instability to temperature changes and susceptibility to oxidation.

Video tapes today are required to have higher density and be longer-playing than heretofore. Efforts are therefore being made to employ finer magnetic powder and greater reduction of the tape thickness. The trends are thus more and more adverse to the adoption of the automatic stopping system that depends on the light transmission through the tape. For instance, further size reduction of the cobalt-containing $\gamma$-$Fe_2O_3$ currently used as the magnetic powder for video tapes would make the tapes more light-transmissive. The use of thinner magnetic tape would add to the transmissivity to make the matter worse.

SUMMARY OF THE INVENTION

The present invention, perfected with the foregoing in view, is aimed at providing a magnetic recording medium having excellent electromagnetic properties, and capability of high density recording in particular, as well as a sufficiently reduced light transmittance to be suitable for use with the system for automatically stopping magnetic tape by the detection of light transmitted through the tape.

According to the invention, a magnetic recording medium is provided which comprises a light-shielding base in the form of a tape or sheet, and a magnetic layer composed of a magnetic powder of Co-coated $\gamma$-$Fe_2O_3$ dispersed in a resin binder and applied to the base, the powder having a specific surface area as determined by the BET adsorption method (hereinafter called a "BET surface area") of at least 35 m²/g.

DETAILED DESCRIPTION OF THE INVENTION

Figure 1:
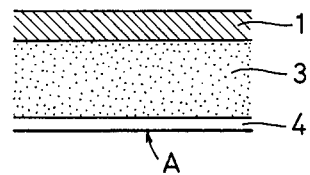
FIGS. 1 to 3 are sectional views of three embodiments A, B, and C, respectively, of the magnetic recording medium according to the invention.

One way of producing a magnetic tape having outstanding electromagnetic properties is the use of a finely divided magnetic powder. For a magnetic tape excellent in electromagnetic properties, especially in signal-to-noise (S/N) ratio, a Co-coated $\gamma$-$Fe_2O_3$, finely divided to a size having a "BET surface area" of at least 35 m²/g, may appear to be an appropriate magnetic powder. However, the magnetic tape using such a magnetic powder on a base of transparent plastic film is unsuitable for the automatic stopping system because of the too high light transmission.

Under the invention, the transparent plastic film as the base is replaced by a light-shielding plastic film which contains carbon, pigment or the like, while the magnetic powder used above is employed again.

The invention will be described in further detail below in connection with a few embodiments thereof shown in the drawings.

Figure 2:
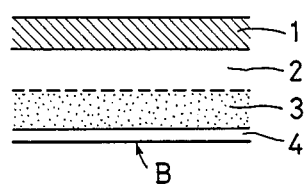
Figure 3:
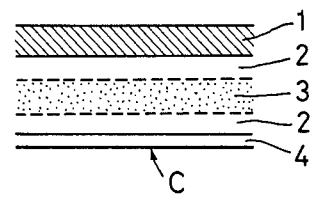
Figure 4:
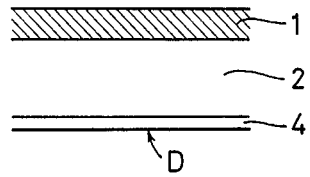
FIG. 4 is a sectional view of a magnetic recording medium D as an example for comparison.

FIGS. 1, 2, and 3 are sectional views of embodiments A, B, and C, respectively, of the magnetic recording medium according to the invention, and FIG. 4 is a sectional view of a comparative magnetic recording medium D. Throughout these figures the numeral 1 designates a magnetic layer, and 2 and 3 designate bases of polyester films, 2 being transparent and 3, light shielding. The numeral 4 indicates a back coating layer.

Magnetic tapes using as the bases a monolayer structure as illustrated in FIG. 1 and double- and triple-layer structures as in FIGS. 2 and 3, all of a light-shielding plastic film, were devised and examined.

With the magnetic tape of FIG. 1, rendered adequately light shielding, it has been found that the base has its limits in being mirror finished through the attainment of uniform surface roughness, as compared with conventional transparent plastic films.

In the case of the magnetic tape based on the double-layer structure as in FIG. 2, an irregularity transfer phenomenon occurred in which the unevenness of the base is reproduced to some measure by the magnetic layer thereon at the time of winding of the tape on a reel after the formation of the magnetic layer. Then, preferable was the magnetic tape shown in FIG. 3. The tape possessed adequate light-shielding properties and proved excellent in electromagnetic properties, particularly in S/N ratio.

For the manufacture of the objective medium, a base layer as shown in any of FIGS. 1 through 4 was first formed. Each base layer was 14.5 μm thick. The surface roughness was adjusted so that the center-line average surface roughness (Ra) might be 0.008 μm, but, with the light-shielding surfaces of the embodiments A and B, the roughness slightly rose to Ra=0.010 μm because the base layer contained a sufficient amount of the light-shielding agent consisting of carbon black to reduce the light transmittance to 30% or below. Preferably, the surface roughness of the base is, in terms of the center-line average surface roughness, 0.012 μm or below. The resultant layers were used without further adjustments.

Over each of the base layers thus obtained, one of the following magnetic powder layers was formed:

Formation of magnetic layers

| Each composition consisting of | |
|---|---|
| Co-coated γ-Fe$_2$O$_3$* | 100 parts by weight |
| vinyl chloride-vinyl acetate-vinyl alcohol copolymer (tradenamed "VAGH") | 15 parts by weight |
| polyurethane resin (tradenamed "Nippollan #2304") | 10 parts by weight |
| carbon | 3 parts by weight |
| fatty acid (having 12-20 carbon atoms) | 1.5 parts by weight |
| fatty acid ester | 3 parts by weight |
| methyl ethyl ketone/methyl isobutyl ketone/toluene equivalent mixture | ab. 250 parts by weight |

*One of the magnetic powders of the particle diameters given in Table 1.

was thoroughly dispersed and mixed by a ball mill. After the addition of about 5 parts by weight of a polyisocyanate, for example, a commercially available product tradenamed "Coronate L", the mixture was applied to one of the base layers to form a coat 3 to 6 μm in thickness. The coat was heated at about 60° C. for 24 hours for a curing reaction.

On the side of the base opposite to the magnetic layer was formed a back coating layer 4. The product was slit into magnetic tapes ½ in. wide. The test tapes made in this way were tested for their electromagnetic properties and light transmittance values. The results are summarized in Table 1.

TABLE 1

| Test piece | BET surface area of magnetic powder (m2/g) | Form of magnetic tape | Electromagnetic properties | | Light transmittance (%) |
|---|---|---|---|---|---|
| | | | Y-S/N (dB) | C-S/N (dB) | |
| Ex. | | | | | |
| 1 | 35 | C | +1.5 | +1.0 | 0.050 |
| 2 | 40 | C | +2.6 | +1.5 | 0.000 |
| 3 | 45 | C | +3.5 | +1.8 | 0.095 |
| 4 | 40 | A | +2.2 | +1.1 | 0.060 |
| 5 | 40 | B | +2.4 | +1.3 | 0.060 |
| Comp. Ex. | | | | | |
| 1 | 25 | D | 0.0 | 0.0 | 0.065 |
| 2 | 35 | D | +1.6 | +1.1 | 0.120 |
| 3 | 40 | D | +2.6 | +1.5 | 0.200 |

The electromagnetic properties given in the table were measured in the following manner.

(1) Y-S/N

A commercially available video tape recorder of the VHS system was used to record 50% white signals. At the time of playback, the S/N ratio of the luminance signals was measured by a noise meter manufactured by Rohde & Schwarz Co., and the measured value was given on the basis of the value of the tape of Comparative Example 1 as zero.

(2) C-S/N

Signals for color noise measurement, APL 100%, were recorded by a commercially available VHS video tape recorder, and the S/N ratio of chroma signals during playback was measured by a noise meter of Rohde & Schwarz Co. The value is given on the basis of the referential value of the tape of Comparative Example 1.

As is obvious from Table 1, the test pieces of magnetic recording medium in Examples 1 to 5 all satisfied the light transmittance requirement and excelled in electromagnetic properties. The tapes of Comparative Examples 2 and 3 failed to meet the light transmittance requirement. In Examples 4 and 5, the unevenness of the base layers was transferred to the magnetic layers thereon during the formation of the layers or when the tapes were wound on reels, with the result that the test tapes were somewhat inferior in electromagnetic properties to the tape of Example 2.

Figure 5:
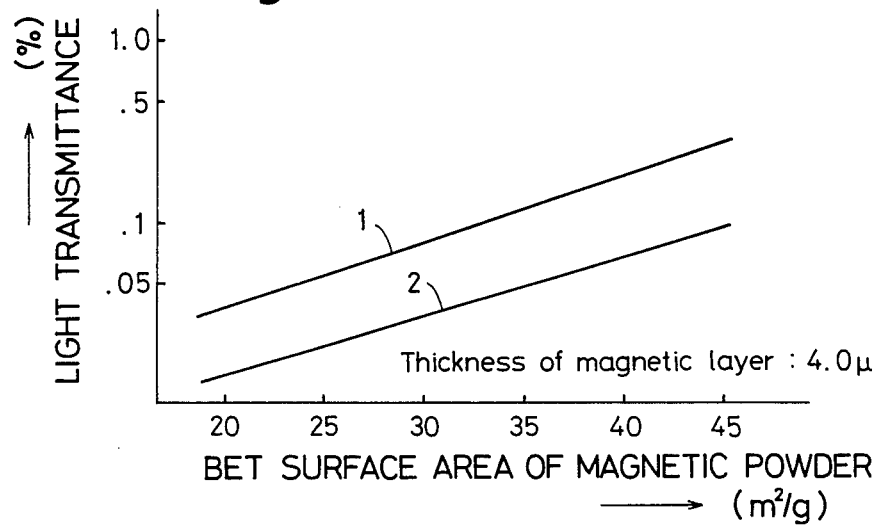
FIG. 5 is a graph showing the relationship between the particle diameter of magnetic powder and the light transmittance of magnetic recording medium.

FIG. 5 is a graph showing the relationship between the particle diameter of magnetic powder and the light transmittance of magnetic tapes manufactured in the afore-described way with special care taken to make the magnetic layer 4.0 μm thick. Line 1 represents a magnetic tape using as the base a transparent plastic film (transmittance=100%), and line 2 repesents a tape using a light-shielding plastic film (30%). It will be understood that the magnetic tape comprising the base of transparent plastic film and a magnetic powder finely divided to a BET surface area of 35 m²/g or more and applied to the base is not suitable for use with the automatic stopping system, because the light transmittance of the tape is as high as 0.1% or upwards. The magnetic tape based on the light-shielding plastic film with a transmittance of 30% shows a light transmittance of less than 0.1% even when the BET surface area of the magnetic powder used is 45 m²/g. This means that the plastic base film is adequately light-shielding if it has a transmittance of 30%.

The magnetic recording medium according to this invention may have a back coating layer formed under the base layer, as indicated in FIGS. 1 to 3, so as to improve the running properties of the tape.

What is claimed is:

1. A magnetic recording medium comprising a light-shielding base in the form of a tape or sheet, and a magnetic layer composed of a magnetic powder of Co-coated $\gamma Fe_2O_3$ dispersed in a resin binder and applied to the upper surface of the base, said powder having a specific surface area as determined by the BET adsorption method of at least 35 m²/g, said base having a surface roughness of 0.012 μm or less in terms of the centerline average surface roughness and said base having a light transmittance of 30% or less.

2. The magnetic recording medium of claim 1 wherein the light-shielding base portion contiguous to the magnetic layer is a transparent plastic film and the lower portion of the base is light-shielding.

3. The magnetic recording medium of claim 1 wherein the base is a triple-layer structure in which the light-shielding layer contiguous to the magnetic layer is a transparent plastic film, the middle layer is light-shielding and the lower layer is a transparent plastic film.

4. The magnetic recording medium of claims 1, 2 or 3 wherein said magnetic recording medium further includes a back coating layer on the lower surface of said base.

* * * * *